United States Patent
Chen

(10) Patent No.: US 12,372,943 B2
(45) Date of Patent: Jul. 29, 2025

(54) GENERATION OF COMPUTER-EXECUTABLE INSTRUCTIONS BASED ON MONITORING NETWORK COMMUNICATIONS OF REMOTE COMPUTING SYSTEMS

(71) Applicant: Starbucks Corporation, Seattle, WA (US)

(72) Inventor: Ningyu Chen, Johns Creek, GA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/906,819

(22) Filed: Oct. 4, 2024

(65) Prior Publication Data
US 2025/0116989 A1    Apr. 10, 2025

Related U.S. Application Data

(60) Provisional application No. 63/588,508, filed on Oct. 6, 2023.

(51) Int. Cl.
*G05B 19/4093* (2006.01)
*G05B 13/02* (2006.01)

(52) U.S. Cl.
CPC ... *G05B 19/40937* (2013.01); *G05B 13/0265* (2013.01); *G05B 2219/32005* (2013.01)

(58) Field of Classification Search
CPC .......... G05B 19/40937; G05B 13/0265; G05B 2219/32005
USPC .......................................................... 700/97
See application file for complete search history.

(56) References Cited

U.S. PATENT DOCUMENTS

| | | | |
|---|---|---|---|
| 10,489,682 B1 | 11/2019 | Kumar et al. | |
| 11,769,017 B1 | 9/2023 | Gray et al. | |
| 2015/0351581 A1* | 12/2015 | Li | A23F 5/26 |
| | | | 700/275 |
| 2015/0358173 A1* | 12/2015 | Li | G08C 17/02 |
| | | | 700/275 |
| 2016/0353932 A1* | 12/2016 | Freas, II | A47J 43/04 |
| 2017/0238753 A1* | 8/2017 | Merali | G08C 17/02 |
| 2017/0323640 A1* | 11/2017 | Sisodia | A23L 5/10 |
| 2020/0242964 A1* | 7/2020 | Wu | G09B 7/02 |
| 2021/0049422 A1 | 2/2021 | Yoon | |
| 2021/0279666 A1* | 9/2021 | Sun | G06Q 30/0639 |
| 2022/0172008 A1* | 6/2022 | Luo | G06V 10/82 |
| 2022/0334172 A1 | 10/2022 | Hayakawa et al. | |

(Continued)

OTHER PUBLICATIONS

International Search Report and Written Opinion in application No. PCT/US2024/050111, mailed on Nov. 25, 2024, in 18 pages.

*Primary Examiner* — Chun Cao
*Assistant Examiner* — Michael Tang
(74) *Attorney, Agent, or Firm* — Knobbe, Martens, Olson & Bear, LLP

(57) ABSTRACT

The disclosure generally relates to a system for identifying a formula to build a customized object. The system may identify one or more attributes of an object based on monitoring remote computing systems. The system may provide a prompt to a computing system based on the identified one or more attributes and the computing system may provide an output indicative of a customized object. The system may identify a formula to build the customized object based on the output. The system may provide an output indicative of the formula and/or the customized object.

25 Claims, 4 Drawing Sheets

(56) References Cited

U.S. PATENT DOCUMENTS

| | | |
|---|---|---|
| 2023/0237277 A1 | 7/2023 | Reza et al. |
| 2023/0404128 A1* | 12/2023 | O'Kelly ............. G06Q 10/0833 |
| 2024/0338746 A1* | 10/2024 | Ahuja ................ G06Q 30/0643 |

* cited by examiner

GENERATION OF COMPUTER-EXECUTABLE INSTRUCTIONS BASED ON MONITORING NETWORK COMMUNICATIONS OF REMOTE COMPUTING SYSTEMS

RELATED APPLICATIONS

This application claims the benefit of priority of U.S. Provisional Patent Application No. 63/588,508, filed Oct. 6, 2023 and entitled "DYNAMIC FORMULA GENERATION FOR BUILDING OBJECTS BASED ON MONITORING REMOTE COMPUTING SYSTEMS," the entire contents of which is hereby incorporated by reference herein.

FIELD

The present disclosure generally relates to a system for building objects.

BACKGROUND

Objects may be associated with formulas that may be used to build the object (e.g., in response to an order).

Figure 1:
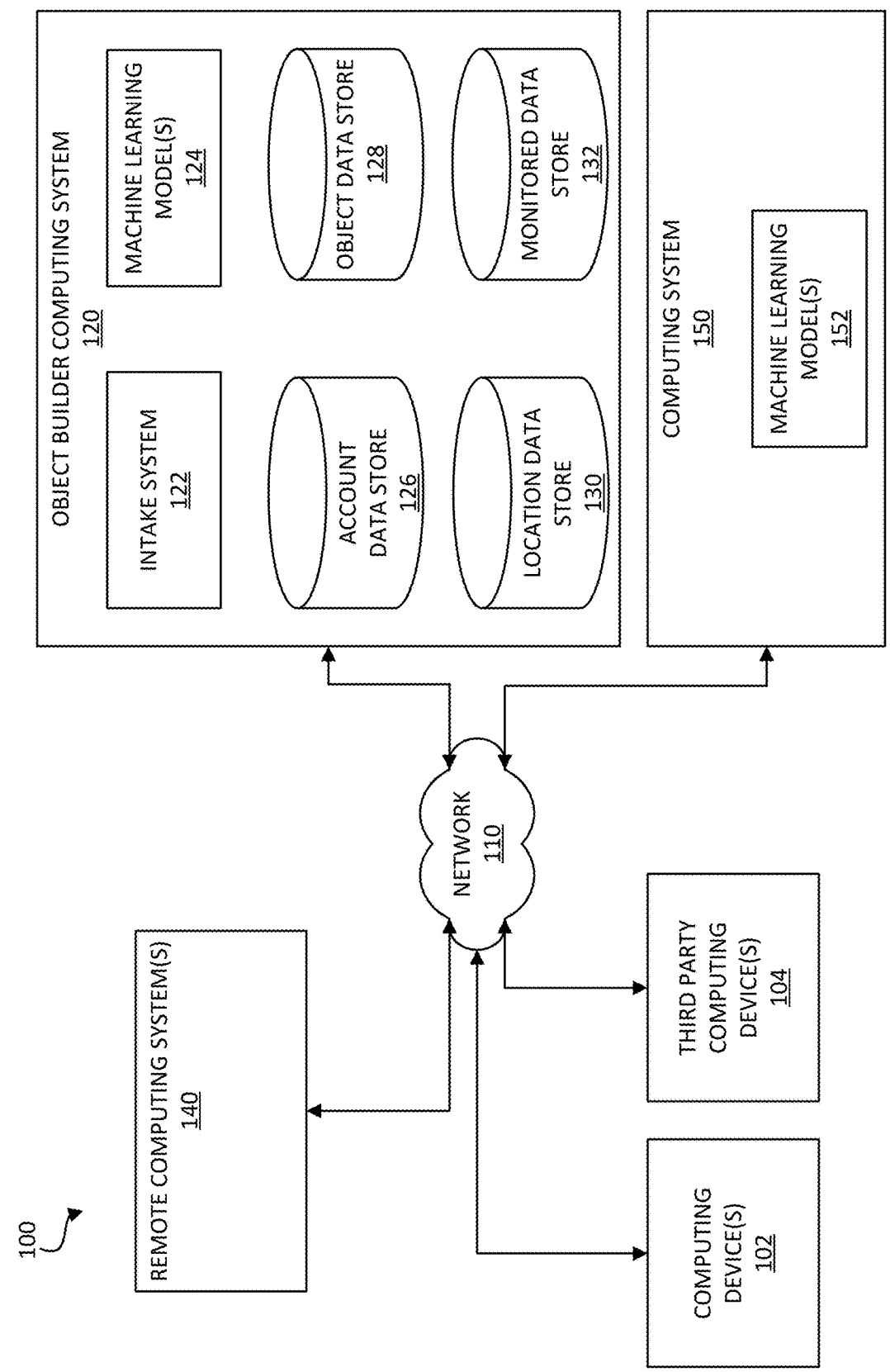
FIG. 1 is a block diagram depicting an illustrative environment in which an object builder computing system can generate a formula for building an object.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Objects (e.g., products, items, etc.) may be associated with formulas (e.g., recipes, specifications, procedures, techniques, plans, blueprints, processes, instructions, etc.) identifying attributes of the object. The attributes of the object may include components (e.g., constituents, elements, ingredients, parts, etc.), techniques (e.g., operations, actions, etc.), proportions (e.g., amounts, ratios, measures, etc.), profiles (e.g., flavor profiles), and/or sequences (e.g., component sequencing, order, component ordering, progression, arrangement, series, etc.) to build the respective objects. The objects may include beverages, food items, etc. (e.g., a coffee, a tea, a fruit-based drink, a sandwich, a burger, etc.) that each may be associated with formulas identifying components to build the respective objects. For example, a beverage #1 may be associated with attributes indicating that 1) the components of the beverage are coffee, toffee syrup, ice, whipped cream, almond milk, and/or nutmeg, 2) a technique associated with the beverage is pour over coffee brewing, drip coffee brewing, French press coffee brewing, etc. for the coffee, 3) a proportion associated with the beverage is 4 parts coffee, 1 part toffee syrup, 1 part ice, 1 part whipped cream, 2 parts almond milk, and/or a ⅓₂ part nutmeg, 4) a flavor profile of the beverage is nutty and/or sweet, and/or 5) a sequence of the beverage is first coffee, second toffee syrup, third ice, fourth almond milk, fifth whipped cream, sixth nutmeg, etc. While the present disclosure may refer to beverages, recipes, and/or ingredients, it will be understood that the present disclosure may apply to any objects, formulas, and/or attributes, respectively.

Objects may be associated with standard (e.g., default, base, basic, etc.) formulas (e.g., a set of standard attributes) via association data. For example, the association data may link each of a limited subset of objects to a particular standard formula. Each of the limited subset of objects may also be associated with machine readable code used to generate the objects. For example, in response to a request to generate an object, machine readable code associated with the object may be provided to a particular machine and may be used to generate the object. Identifiers of each of the limited subset of objects may also be provided to user computing devices for display via one or more user interfaces.

All or a portion of the standard formulas may be predetermined formulas with specific attributes. For example, all or a portion of the standard formulas may be designed to yield an object with a particular taste or calorie count, that follows a particular dietary restriction, that provides a particular flavor profile, etc. based on the specific attributes. Further, the standard formulas may indicate that the object is to be built in a particular sequence using a particular technique (e.g., a particular sequence of techniques using a particular sequence of components) and output into a particular receptacle (e.g., container, cup, etc.) based on the yield of the object (e.g., a 20 oz. beverage may be output or designed for output into a large size cup, a 16 oz. beverage may be output or designated for output into a medium size cup, a 12 oz. beverage may be output or designated for output into a small size cup, etc.)

In traditional systems, a user may be limited to selecting and requesting generation of an object from the limited subset of objects (e.g., via a limited menu) that are each associated with a standard formula (e.g., a preset formula). For example, a computing system may provide the limited subset of objects to a user computing device for selection of a particular object. While a user may manually request modifications (e.g., beverage modifications) to an object and/or may manually request a customized object, the user may be required to manually provide the modifications and how to generate the modified or customized object to the computing system. This may require the user to manually memorize and/or track the attributes of the modified or customized object. In some cases, certain modifications may not be available to a user. For example, certain modifications may be blocked or may require third party approval. This may lead to an inadequate user experience as such a manual process may be time consuming and inefficient. Further, due to the numerous possible combinations of attributes used to generate objects (e.g., 100s of possible unique combinations), user may not be able to manually memorize and/or track the modifications and/or how to generate the modified or customized object. Such a manual process may lead to a disjointed user experience as a user may obtain a first object in response to requesting a modified or customized object (e.g., that is not located in the limited subset of objects) during a first time period and a second, different object in response to requesting the same modified or customized object during a second time period due to differences in how the user requested the modified or customized object.

Furthermore, in traditional systems, in response to receiving a request for a modified or customized object (e.g., via an order), a human worker may determine that the customized object is not included in the limited subset of objects (e.g., is not associated with a standard formula), may manually determine a customized formula for the modified or customized object, and may manually create the modified or customized object according to the customized formula. As different workers may determine and utilize different customized formulas, manually creating objects in such a manner can result in inconsistent object compositions.

Additionally, in traditional systems, objects may be manually added to the limited subset of objects which can cause significant delays and result in an inefficient and time-consuming process. For example, a human worker may identify an object to be added to the limited subset of objects, perform a vetting process for the object, and update machines used to generate the object, user interfaces displaying information about the objects, etc. In some cases, objects may be manually added to the limited subset of objects by a first subset of users (e.g., associated with particular permission levels) and may not be added to the limited subset of objects by a second subset of users. For example, requests to add an object to the limited subset of objects may be denied if a permission level of a user does not satisfy a permission threshold.

Therefore, in traditional systems, there may be a significant delay between identifying the object for addition to the limited subset of objects and adding the object to the limited subset of objects. For example, a human worker may identify the object and transmit a request to add the object to the limited subset of objects during a first time period and the object may be subsequently added to the limited subset of objects (e.g., after a vetting period) during a second time period.

This may be problematic to the user experience, as a user may request particular popular objects (e.g., objects that have a particular level of popularity). These popular objects may include modifications to objects included in the limited subset of objects (e.g., modified objects) or may not be based on objects included in the limited subset of objects (e.g., custom objects). As these objects may not be included in the limited subset of objects, the objects may not be associated with a standard formula which can lead to disparate user experiences. For example, a user selecting (e.g., ordering) the same beverage on multiple occasions may ultimately receive beverages with noticeably different beverage compositions because the beverage is not associated with a standard formula, which can negatively affect the user's experience. In another example, users selecting the same beverage may ultimately receive beverages with noticeable different beverage compositions, which can cause a disparate experience for the users. Furthermore, because modifications to the formula may unavoidably modify attributes of the object, such modifications can undesirably detract from the original intent and/or profile (e.g., flavor profile) of the object.

In some cases, users may select objects based on modifications to a standard formula associated with the object. However, traditional systems may not identify and store the resulting modified formula. As the object associated with the modified formula may gain notoriety (e.g., fame, popularity, etc.), it may be problematic that traditional systems may be unable to recreate the object associated with the modified formula as the traditional systems may be unable to capitalize on the associated notoriety. Further, traditional systems may be unable to recreate the modified formula for users (e.g., the same user who originally selected the formula or a different user). Additionally, as users iteratively request modifications to previously modified formulas, traditional systems may result in increasingly larger disparities between objects.

The inconsistences resulting from manually creating objects can result in inefficiencies within the traditional systems. For example, workers may be requested to remake objects that are inconsistent with other objects and/or issue refunds. Such a use of the systems to remake objects and/or issue refunds may result in system inefficiencies as the systems may be required to process additional data to remake objects and/or issue refunds. Further, such a use of the systems may result in system lag and additional power usage.

To address these or other concerns, disclosed herein is a system for identifying objects to add to the limited subset of objects (e.g., that were not previously included in a catalog and/or the limited subset of objects) and generating formulas to build the objects. For example, the system may identify modifications to an object and may generate a formula to build the modified object. The system may use external data (e.g., a first set of data, based on monitoring remote computing systems, that is indicative of a trending object) and internal data (e.g., a second set of data, from a local data store, that is indicative of a base set of attributes for the object) to generate a prompt for a machine learning model. Based on providing the prompt to the machine learning model, the system may obtain an output that is indicative of the formula to build the object.

To identify objects to add to the limited subset of objects, the system can identify a first set of data indicative of one or more objects, one or more modifications, one or more attributes, etc. that are trending (e.g., have an exposure that satisfies an exposure threshold). For example, the first set of data may indicate a particular flavor profile (e.g., a smoky flavor profile), a particular component sequencing (e.g., upside down drinks where the order in which components are added to the drink are reversed such as adding water first and espresso second to an americano), etc.

In some cases, to identify the first set of data, the system may monitor one or more remote computing systems. For example, the system may monitor data (e.g., video data, image data, text data, etc.) associated with the one or more remote computing systems. The one or more remote computing systems may be located remotely and/or separately from the system. In some cases, to identify objects to add to the limited subset of objects, the system may monitor one or more local computing systems and/or components of the system. The one or more remote computing systems may include computing systems, computing devices, servers, etc. In some cases, the one or more remote computing systems may include data stores.

The system may monitor the one or more remote computing systems by monitoring communications between remote computing systems, monitoring transmissions by a remote computing system, monitoring data posted by a remote computing system (e.g., to a forum, to a video-sharing application or site, etc.), monitoring data hosted or made available by a remote computing system, etc. For example, the system may monitor a TikTok server, an Instagram server, a Twitch server, a Discord server, etc. to identify data.

In some cases, to identify the first set of data, the system may obtain order data. For example, the order data may indicate one or more orders or requests for one or more objects, for objects with one or more attributes, etc. The first set of data may include all or a portion of the order data.

In some cases, to identify the first set of data, the system may obtain search data. For example, the search data may indicate one or more searches, one or more search requests, etc. The first set of data may include all or a portion of the search data.

In some cases, to identify the first set of data, the system may obtain data associated with one or dietary restrictions, allergies, preferences, etc. For example, the data may be associated with analytics data including and/or indicating an exposure (e.g., a distribution, a popularity, likes, interactions, views, response, clicks, tags, etc.) of one or more dietary restrictions or allergies (e.g., a distribution of a peanut allergy, a distribution of lactose intolerance, a distribution of a low calorie diet, etc.), a preference for one or more flavor profiles (e.g., a preference for sweet flavor profiles, a preference for a salty flavor profile as opposed to a sweet flavor profile, etc.), and/or an ordering of particular objects (e.g., objects with a smoky flavor profile, a tart flavor profile, etc.). The first set of data may include all or a portion of the data.

The system may analyze the data to determine whether all or a portion of the data is associated with (e.g., mentions, includes, references, calls out, etc.) a particular object, a particular attribute (e.g., a particular flavor profile), a particular physical environment, a particular brand or type, etc. For example, the object may be an americano, a lemonade, a bacon, lettuce, and tomato sandwich, etc. In another example, the attribute may be a sweet flavor profile, a non-sweet flavor profile, a strong coffee flavor profile, a weak coffee flavor profile, a fruity flavor profile, a milky flavor profile, a non-milky flavor profile, a smoky flavor profile, an alcoholic flavor profile (e.g., a bourbon flavor profile), etc. In another example, the physical environment may be a particular store, a particular geographical location, a particular type of ordering, etc. In another example, the brand or type may be a particular brand of coffee, a particular type of coffee (e.g., white coffee), a particular type of container, a particular type of sweetener, etc.

In some cases, the system may analyze the data using image comparison, audio-to-text conversion, optical character recognition, etc. to determine whether the data is associated with a particular object, profile, physical environment, brand, or type. In some cases, the system may analyze text data (e.g., tags, captions, labels, text converted from audio, etc.) associated with the data to determine whether the data is associated with the particular object, profile, physical environment, brand, or type. For example, the system may determine that the data is associated with a particular object, profile, physical environment, brand, or type based on performing audio-to-text conversion on the data and determining that the generated text data is associated with the particular object, profile, physical environment, brand, or type.

Based on determining that all or a portion of the data is associated with a particular object, profile, physical environment, brand, or type, the system may determine whether the all or a portion of the data associated with the same object, profile, physical environment, brand, or type is associated with analytics data (e.g., a number, quantification, rating, etc. of exposures) that satisfies an exposure threshold (e.g., an interaction threshold, a like threshold, a view threshold, a response threshold, a click threshold, etc.). For example, the exposure threshold may be an exposure threshold value, an exposure threshold range, etc.

In some cases, the system may obtain the analytics data (e.g., from a remote computing system). In some cases, the system may identify and/or generate the analytics data by identifying exposures associated with the all or a portion of the data (e.g., based on monitoring the remote computing systems and/or based on data made available by the remote computing systems) and may determine whether the exposures are greater than, less than, match, or are within an exposure threshold.

The system may determine that the data (or a subset of the data) associated with a particular object, profile, physical environment, brand, or type is associated with analytics data (e.g., indicating exposures of the particular object, profile, physical environment, brand, or type) satisfying (e.g., matching, greater than, or within) an exposure threshold. In response to determining that the data is associated with analytics data satisfying the exposure threshold, the system may determine a first set of data (e.g., that may include the data associated with analytics data satisfying the exposure threshold). For example, the first set of data may be indicative of a particular object, profile, physical environment, brand, or type for generation of modified object to be added to the limited subset of objects. In another example, the first set of data may be indicative of one or more modifications to an object.'

To add an object to the limited subset of objects, the system may identify (e.g., generate) a second set of data associated with the particular object, profile, physical environment, brand, or type (e.g., indicative of the object and/or the profile). The system may identify the second set of data based on the first set of data. For example, a portion (e.g., a field, afield value, etc.) of the first set of data may reference an object and the system may use the first set of data to identify the second set of data that indicates a formula (e.g., a standard formula) for the object).

In some cases, the system may obtain the second set of data from a local data store. For example, the system may obtain the second set of data based on (e.g., from) the limited subset of objects.

In some cases, the second set of data may include and/or may indicate a standard formula for the object (e.g., may indicate a threshold, ratio, quantity, etc. of attributes of the object). For example, the system may obtain a first set of data indicating that a modification to beverage #1 that includes substituting water with lemonade is trending and may obtain a second set of data associated with the beverage #1 (e.g., a standard formula for the beverage #1) based on determining that the modification is trending. In another example, the system may obtain a first set of data indicating that smoky beverages are trending and may obtain a second set of data associated with smoky beverages, beverages that can be made smoky, beverages with flavor profiles that are compatible with a smoky flavor profile, etc.

In some cases, the system may perform image comparison, audio-to-text conversion, optical character recognition, captioning, etc. to generate the first set of data and/or the second set of data. The second set of data may be in a first data format (e.g., a string of text). For example, the second set of data may be and/or may include: "1 part frozen strawberries, 1 part lemonade, 2 parts water, combine," "smoky," "substitute water with lemonade in beverage #1," etc. In some cases, the data obtained based on monitoring the remote computing systems may be in a first data format (e.g., a video) and the second set of data may be in a second data format (e.g., a string of text). In some cases, the first set of data and the second set of data may be in the same data format.

The system may provide an input based on the first set of data and/or the second set of data to a machine learning model. For example, the input may include a prompt for the machine learning model and the system may perform prompt engineering to generate the prompt based on the first set of data and/or the second set of data.

Based on the input, the machine learning model may generate an output. For example, the machine learning model may be trained to generate a particular output based on a particular input. The output of the machine learning model may identify an object and/or a formula (e.g., a standard formula) for generating the object (e.g., a smoky beverage) based on the data indicative of the object or profile (e.g., indicating that smoky beverages are trending). In some cases, the system may generate a formula for the object based on the output of the machine learning model.

In some cases, the output of the machine learning may identify an object and a formula for generating the object (e.g., a smoky and sweet modification to beverage #1 that incorporates elements of beverage #2) based on data indicative of multiple objects and/or profiles (e.g., indicating that smoky and sweet beverages are trending, beverage #1 is trending, and/or beverage #2 is trending).

The machine learning model may be hosted and/or implemented by the system or a different system (e.g., a remotely located computing system). The machine learning model may be trained to provide a standard formula (indicative of particular attributes) for an object based on data indicative of the object. For example, the input to the machine learning model may be: "1 part frozen strawberries, 1 part lemonade, 2 parts water, combine" and output of the machine learning model may be: "for a small customized beverage, mix 1 cup of frozen strawberries, 1 cup of lemonade, and 2 cups of water in a blender until combined, then pour the mixture into a small size cup and top with ice." In some cases, the machine learning model may be trained to output data in a third data format. For example, the machine learning model may output computer-executable instructions and/or machine readable code that, when executed by a machine (e.g., a coffee machine, an espresso machine, a warming wall, a dispenser, etc.), causes a machine to generate the object.

In some cases, the system can provide, to the machine learning model, one or more constraints to the machine learning model with and/or as part of the input. For example, the prompt for the machine learning model may include one or more constraints.

In some cases, the one or more constraints may be based on and/or may include account data. The account data may indicate historical object data (e.g., objects previously selected and/or purchased by one or more users) and/or physical environment data (e.g., indicating machines associated with a particular physical environment and/or available to build the object). Therefore, the output of the machine learning model may be based on the account data.

In some cases, the one or more constraints may be based on and/or may include one or more attribute thresholds (e.g., health and safety thresholds). For example, the attribute thresholds may be size thresholds (e.g., no more than a 32 oz. beverage), caffeine thresholds (e.g., no more than 400 milligrams of caffeine), sugar thresholds (e.g., 50 grams of sugar), alcohol thresholds (e.g., 14 grams of alcohol), etc. In some cases, the system may identify the one or more attribute thresholds based on performing a web scrape (e.g., based on monitoring health and safety data). Therefore, the output of the machine learning model may be based on the one or more attribute thresholds.

The machine learning model may provide an output with one or more attributes that satisfy (e.g., is within or is less than) the one or more constraints. For example, the first set of data and/or the second set of data may indicate that a beverage is to include 800 milligrams of caffeine and the one or more constraints may indicate a caffeine threshold of 400 milligrams the output of the machine learning model may indicate that the beverage is to include a lower amount of caffeine (e.g., 400 milligrams of caffeine) to satisfy the caffeine threshold and may indicate other adjustments (e.g., less water, less milk, etc.) to the beverage to account for the change in caffeine and/or to achieve similar attributes (e.g., a similar flavor profile). In another example, the first set of data and/or the second set of data may indicate that a beverage is to include 500 milligrams of nitro cold brew coffee and the one or more constraints may indicate that a physical environment does not include a nitro cold brew tap but does offer iced coffee. Accordingly, the output of the machine learning model may indicate that the beverage is to substitute the nitro cold brew coffee for iced coffee and may indicate other adjustments (e.g., less water, less milk, etc.) to the beverage to account for the change in the coffee and to achieve similar attributes (e.g., a similar flavor profile).

In some cases, the system can provide a location based subset of objects. For example, the system can identify that the first set of data is associated with a particular location (e.g., the analytics data indicates that an object associated with the first set of data has an exposure satisfying an exposure threshold in a first location but not in a second location). The system may determine a location associated with the first set of data (e.g., a location where the analytics data indicates that an object associated with the first set of data has an exposure satisfying an exposure threshold) and may add a generated object to a limited subset of objects associated with the same location. For example, the system may determine that social media users in a particular location (e.g., New York City, a location defined by a mile radius from a central location, etc.) correspond to a first set of data (e.g., have interacted with data indicative of an object) such that the corresponding exposure satisfies than a threshold exposure.

In some cases, the system can provide one or more location specific constraints (e.g., location specific attribute thresholds) to the machine learning model with the input. For example, New York City may be associated with a different location specific attribute threshold as compared to rural South Dakota.

The system may provide the output and/or the formula to one or more other systems. For example, the system may provide the output to a machine learning model (e.g., implemented locally or remotely) that is trained to generate text data (e.g., names, descriptions, keywords, tags, etc.) and/or image data (e.g., graphics) for the object and may obtain a second output from the machine learning model. In another example, the system may provide the output to a machine learning model (e.g., implemented locally or remotely) that is trained to generate training data (e.g., a training manual) and may obtain a second output from the machine learning model. In another example, the system may provide the output to a machine learning model (e.g., implemented locally or remotely) that is trained to generate educational data (e.g., educational material) and may obtain a second output from the machine learning model.

Based on the output, the system can cause display of the object or data associated with the object via one or more displays (e.g., via displays of user computing devices). Further, the system can add the object to the limited subset of objects available for selection (e.g., a menu). In some cases, the system can provide the object or data associated with the object to one or more machines (e.g., dispensing systems) and instruct or cause the one or more machines to generate the object (e.g., build the object).

In light of the description herein, it will be understood that the embodiments disclosed herein substantially improve object quality and consistency across a fleet of systems and substantially increase the number of objects available for selection by automating the addition of objects and the formula generation for objects that may include any of thousands or millions of possible modifications/combinations. Specifically, the embodiments disclosed herein enable a system to dynamically and proactively identify objects, generate formulas (including, for example, ingredients, precise volumes of ingredients, and sequence instructions), and facilitate precise, automated generation of the object in accordance with a generated formula. The ability to automatically generate formulas for objects that satisfy exposure thresholds greatly reduces object-creation time, as less time is spent by users manually determining or modifying a formula; and reduces complexity, memorization effort, and training burden. Furthermore, by automatically identifying objects that satisfy exposure thresholds, the system can proactively determine and estimate component consumption, thereby improving accuracy in tracking inventory and planning for inventory restocking.

I. ENVIRONMENT OVERVIEW

FIG. 1 is a block diagram of an illustrative operating environment 100 in which computing device(s) 102 (e.g., computing devices associated with a user, computing devices associated with a particular physical environment, etc.), third party computing device(s) 104 (e.g., computing devices that may not be associated with a particular user or may be associated with a group of users), remote computing system(s) 140, and/or computing system 150 may interact with an object builder computing system 120 via a network 110.

By way of illustration, various types of computing device (s) 102 may be in communication with the object builder computing system 120 (the object builder system), including a desktop computer, laptop, and/or a mobile phone. In general, the computing device(s) 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The object builder computing system 120 may provide the computing device(s) 102 with one or more user interfaces, command-line interfaces (CLI), application programing interfaces (API), and/or other interfaces for displaying one or more objects (e.g., as part of a computer display). Although one or more embodiments may be described herein as using a user interface, it should be appreciated that such embodiments may, additionally or alternatively, use any CLIs, APIs, or other interfaces.

By way of further illustration, various example third party computing device(s) 104 may be in communication with the object builder computing system 120, including an electronic display, a billboard, a television monitor, or any other computing device. In general, the third party computing device(s) 104 may be any computing device and the object builder computing system 120 may provide the third party computing device(s) 104 with object data indicating one or more objects for display for a user.

In some cases, the third party computing device(s) 104 may include any computing devices to receive data associated with an object, a user, a physical environment, etc. (e.g., identifying and/or indicating a purchase of an object by a user). For example, the third party computing device(s) 104 may include a cash register computing system that identifies purchases of particular objects by a particular user. Therefore, the user may select and/or purchase an object via the third party computing device(s) 104.

In some cases, the third party computing device(s) 104 may include any computing devices to receive data identifying a search, a request, etc. associated with a particular object. For example, the third party computing device(s) 104 may include a device that identifies searches for objects.

The remote computing system(s) 140 may be one or more computing systems (e.g., computing devices, servers, etc.) located remotely from the object builder computing system 120. The object builder computing system 120 may monitor the remote computing system(s) 140 (e.g., data associated with the remote computing system(s) 140). For example, the object builder computing system 120 may monitor data transmitted between the remote computing system(s) 140, data transmitted from other computing devices to the remote computing system(s) 140, data transmitted by the remote computing system(s) 140, data hosted by the remote computing system(s) 140, etc.

The computing system 150 may implement machine learning model(s) 152. For example, the computing system 150 may implement one or more large language models such as Chat Generative Pre-trained Transformer ("ChatGPT"), Pathways Language Model ("PaLM"), Large Language Model Meta Artificial Intelligence ("LLaMA"), etc.

Network

The computing device(s) 102, the third party computing device(s) 104, the object builder computing system 120, the remote computing system(s) 140, and/or the computing system 150 may communicate via a network 110, which may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Object Builder Computing System

The object builder computing system 120 may be implemented directly in hardware or software executed by hardware devices and may, for instance, include one or more physical or virtual servers implemented on physical computer hardware configured to execute computer-executable instructions for performing various features that will be described herein.

In the example of FIG. 1, the object builder computing system 120 is illustrated as connected to the network 110. In some embodiments, any of the components within the object builder computing system 120 can communicate with other components of the object builder computing system 120 via the network 110. In other embodiments, not all components of the object builder computing system 120 are capable of communicating with other components of the environment 100. In one example, only the intake system 122 may be connected to the network 110, and other components of the object builder computing system 120 may communicate with other components of the environment 100 via the intake system 122.

In FIG. 1, the computing device(s) 102 and/or the third party computing device(s) 104, may interact with the object builder computing system 120. In some embodiments, the computing device(s) 102 may be user computing devices to enable a user to perform one or more operations. For example, the users may be customers and the customers may establish an account and purchase one or more objects via the account. The users may register an account via the computing device(s) 102 and/or the third party computing device(s) 104. Further, the user can use the account to purchase one or more objects. For example, the account may be associated with particular account data (e.g., an account identifier, payment data, location data, billing data, purchase history data, etc.). Based on the account associated with the user, the user can purchase one or more object via an object purchase computing system.

In other embodiments, the computing device(s) 102 may be associated with an account of an organization, a physical environment, etc. Each physical environment in a plurality of physical environments (e.g., stores) may be associated with a particular account to provide data associated with the physical environment. For example, the computing device(s) 102 may be associated with a particular physical environment account and a user may provide account data (e.g., store account data) indicating data associated with the physical environment. For example, the account data associated with the physical environment may indicate objects available for purchase, sales, revenue, etc.

The computing device(s) 102 and/or the third party computing device(s) 104, may provide various object data, sales data, and/or purchase data as account data to the object builder computing system 120. Therefore, the account data may identify a plurality of previous object purchases, object sales, etc. associated with a particular account (e.g., objects selected, purchased, obtained, etc. by a particular user and/or objects provided at a particular physical environment).

The object builder computing system 120 may identify a first set of data (e.g., indicating one or more modifications to an object of a limited subset of objects). For example, the object builder computing system 120 may obtain monitored data as discussed herein and the first set of data may include all or a portion of the monitored data. In another example, the object builder computing system 120 may obtain the first set of data directly from another system or the object builder computing system 120 may generate the first set of data.

As discussed above, to identify the first set of data, the object builder computing system 120 may monitor the remote computing system(s) 140 by monitoring communications between remote computing systems, monitoring transmissions by or to a remote computing system, monitoring data posted by a remote computing system (e.g., to a forum, to a video-sharing application or site, etc.), monitoring data hosted or made available (e.g., tags) by a remote computing system, etc. For example, the system may monitor a TikTok server, an Instagram server, a Twitch server, a Discord server, etc. to identify data.

In some cases, to identify the first set of data, the object builder computing system 120 may perform a web crawl, a web scrape, etc. For example, the object builder computing system 120 may identify a domain, site, etc. associated with one or more objects and may perform (e.g., periodically) a web crawl to visit the domain, site, etc. and identify content associated with the domain, site, etc.

In some cases, to identify the first set of data, the object builder computing system 120 may monitor the remote computing system(s) 140 and generate monitored data by performing audio-to-text conversion, optical character recognition, captioning, image comparison, etc. on data associated with the remote computing system(s) 140. For example, the object builder computing system 120 may identify video data based on monitoring the remote computing system(s) 140, may perform audio-to-text conversion based on the video data, and may generate monitored data based on performing the audio-to-text conversion.

The object builder computing system 120 may store the monitored data in a monitored data store 132. As discussed above, the object builder computing system 120 may store the monitored data in response to determining that an exposure of the monitored data satisfies an exposure threshold.

To determine how to customize an object according to the first set of data, the object builder computing system 120 may obtain a second set of data. For example, the object builder computing system may obtain a second set of data that may include account data, object data, location data, etc.

Intake System

To obtain the second set of data and enable the building of objects (e.g., customized objects), the object builder computing system 120 includes an intake system 122, which can enable interaction with the computing device(s) 102, the third party computing device(s) 104, the remote computing system(s) 140, and/or the computing system 150. In an illustrative embodiment, the intake system 122 intakes data from computing devices, enabling users (via computing device(s) 102 and/or third party computing device(s) 104) to generate data and provide the data to the object builder computing system 12. The intake system 122 may include and/or implement a display system (e.g., a user interface) that causes display of a display via the computing device(s) 102 and/or the third party computing device(s) 104 providing the ability for the user, via the computing device(s) 102 and/or the third party computing device(s) 104, to select particular objects.

Account Data Store

The object builder computing system 120 may include an account data store 126 storing all or a portion of the second set of data (e.g., account data). For example, the second set of data may include account data identifying a plurality of previous objects selected (e.g., purchased) by a user, text data or image data provided by or utilized in a search by the user, data identifying a plurality of previous object sales by a store, market research data, etc. In some embodiments, the object builder computing system 120 may obtain the second set of data from a third party computing system. In some cases, the object builder computing system 120 may store additional second set of data in the account data store 126. The additional second set of data may include additional data about the account, the physical environment, and/or the user. For example, the additional second set of data may include additional account data identifying the account, the user, etc. (e.g., a location associated with the account, a telephone number associated with the account, etc.). Further, the additional second set of data may include data determined from the account data (e.g., by the object builder computing system 120). For example, the additional second set of data may include data identifying frequent purchases of the user or a group of users, infrequent purchases of the user or the group of users, favorite purchases of the user or the group of users, the average time and/or day of purchases or between purchases, etc.

Object Data Store

The object builder computing system 120 may include an object data store 128 storing all or a portion of the second set of data (e.g., object data). For example, the second set of data may include object data identifying a limited subset of objects (e.g., one or more objects that are available, were previously available, or will be available for selection or purchase by the user). The second set of data may further include association data associating (e.g., linking) each of the limited subset of objects to a particular standard formula (e.g., a set of attributes). For example, the second set of data may include object data (e.g., identifying objects), formula data (e.g., identifying formulas or sets of attributes), and/or association data (e.g., associating respective objects with respective formulas).

Location Data Store

The object builder computing system 120 may include a location data store 130 storing all or a portion of the second set of data (e.g., location data). For example, the second set of data may include location data identifying a location (e.g., region, geographic location, etc.) of the limited subset of objects, the computing device(s) 102, the third party computing device(s) 104, the remote computing system(s) 140 (e.g., a location associated with the monitored data), etc. In some cases, the second set of data may indicate a first location for one or more first objects, a second location for one or more second objects, etc.

Monitored Data Store

The object builder computing system 120 may include a monitored data store 132 all or a portion of the first set of data (e.g., the monitored data). For example, the first set of data may include results of monitoring the remote computing system(s) 140.

In some cases, the object builder computing system 120 may store monitored data in the monitored data store 132 based on determining that analytics data associated with the monitored data indicates an exposure (e.g., interactions, likes, views, responses, clicks, tags, etc.) associated with the monitored data satisfies an exposure threshold (e.g., an interaction threshold, a like threshold, a view threshold, a response threshold, a click threshold, a number of tags threshold, etc.). In some cases, the object builder computing system 120 may generate the analytics data (e.g., based on reviewing the monitored data). In some cases, the object builder computing system 120 may obtain the analytics data from a computing system (e.g., from the remote computing system(s) 140).

In some cases, the object builder computing system 120 may include a threshold data store. The threshold data store may store one or more constraints (e.g., one or more attribute thresholds) and/or one or more exposure thresholds. In some cases, the one or more constraints and/or the one or more exposure thresholds may be location-specific (e.g., may be associated with a particular location).

In some cases, the object builder computing system 120 may obtain the first set of data by filtering the monitored data according to the one or more exposure thresholds. For example, the object builder computing system 120 may compare the monitored data to the one or more exposure thresholds and may identify the first set of data as all or a portion of the monitored data that satisfies the one or more exposure thresholds.

In some cases, the object builder computing system 120 may obtain the first set of data by filtering the monitored data using the location data (e.g., filtering the monitored data to identify monitored data associated with a particular location).

Machine Learning Model

In order to determine formulas (e.g., a set of attributes) for objects not included in the second set of data stored in the object data store 128 (e.g., the limited subset of objects) and/or customizations to objects included in the second set of data stored in the object data store 128 (e.g., but the customized object is not included in the second set of data), the object builder computing system 120 may include and/or implement machine learning model(s) 124 (e.g., a neural network).

The object builder computing system 120 may provide, to the machine learning model(s) 124, an input (e.g., a prompt) based on data obtained from the account data store 126, the object data store 128, the location data store 130, the monitored data store 132, and/or a threshold data store. The object builder computing system 120 may provide as input all or a portion of the first set of data and/or all or a portion of the second set of data. For example, the input may be based on object data indicating a plurality of previous objects selected or purchased by the user or a group of users, the monitored data based on monitoring the remote computing system(s) 140, the location data indicating a location of the user and/or a location of the remote computing system(s) 140, etc. The machine learning model(s) 124, based on the received input, may dynamically provide an output indicative of an object and/or an associated formula (e.g., a set of attributes to build the object).

In some cases, instead of or in addition to providing the input to the machine learning model(s) 124, the object builder computing system 120 may provide the input (or a separate input) to the computing system 150. The computing system 150 may implement machine learning model(s) 152 (similar to machine learning model(s) 124) and may obtain an output from the machine learning model(s) 152 indicative of an object and/or an associated formula. The computing system 150 may provide the output to the object builder computing system 120.

In some cases, the object builder computing system 120 may provide the output of the machine learning model to one or more other machine learning models (implemented by the object builder computing system 120 or a separate system). The one or more other machine learning models may be trained to provide text data and/or image data based on an input indicative of an object and/or an associated formula. For example, the text data and/or image data may include graphics for display, training material indicating how to build the object, nutritional data, educational material indicating data associated with the object, machine-readable code or instructions, etc.

The object builder computing system 120 may cause display of the object, the associated formula, the output, the text data, the image data, etc. via a user interface (e.g., via a virtual menu). In some cases, the object builder computing system 120 may cause the object to be generated via one or more machines (e.g., dispensing systems). The object builder computing system 120 may dynamically modify a set of data (e.g., data used to generate a catalog, a menu, a user interface, etc.) based on the output. For example, the object builder computing system 120 can add (e.g., automatically) the object and/or the associated formula to object data stored by the object builder computing system 120.

II. INTERACTIONS OVERVIEW

Figure 2:
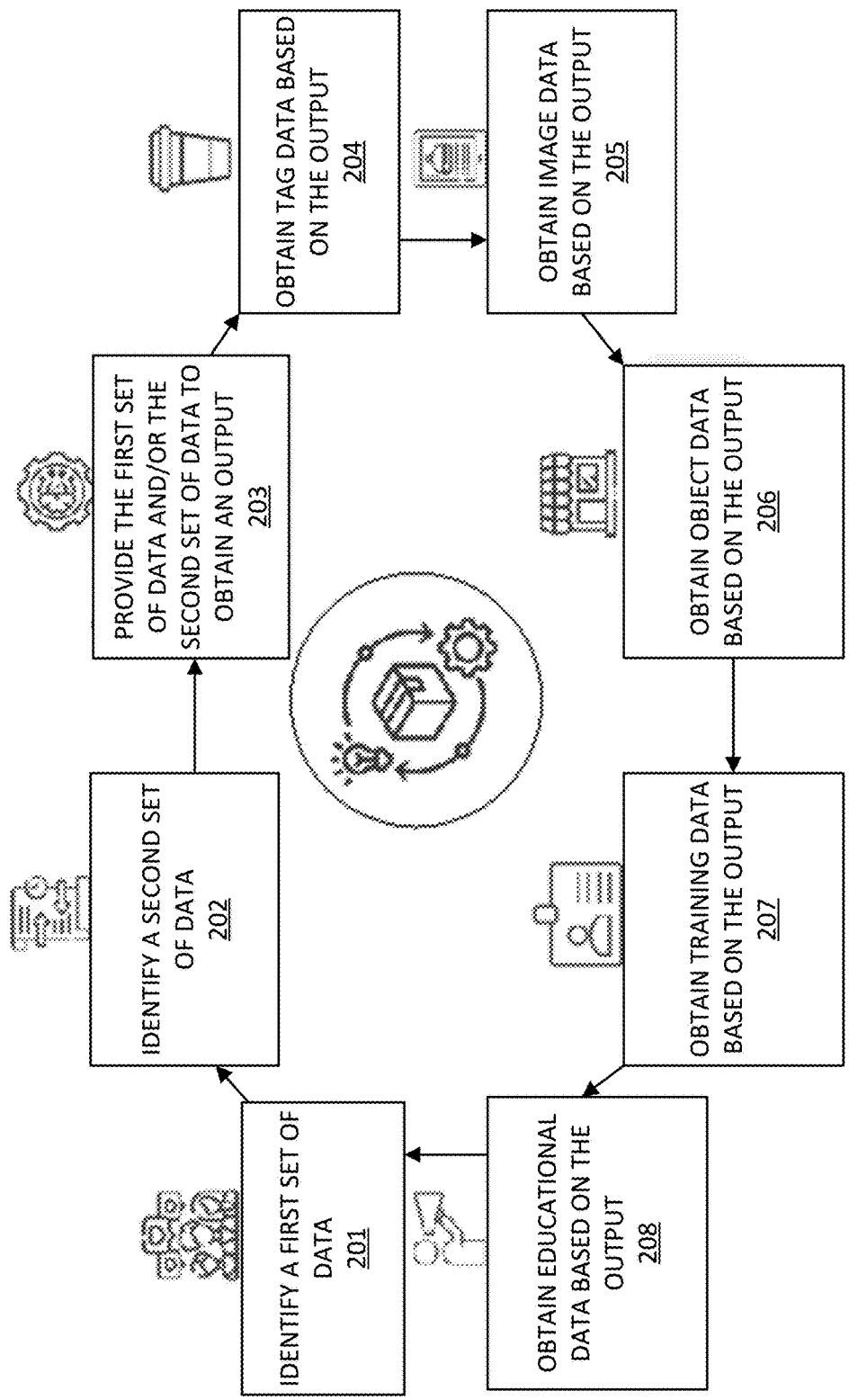
FIG. 2 is a flow diagram depicting example interactions for building an object.

FIG. 2 depicts interactions among various components shown in FIG. 1 for generating an output based on monitored data. The interactions may be implemented by various components implemented in a configuration as identified in FIG. 1. For example, the one or more components may be implemented at least in part by the object builder computing system 120, the computing system 150, etc. In the example of FIG. 2, the interactions will be described as being implemented by an object builder computing system, but it will be understood that all or a portion of the interactions may be implemented by different systems.

As shown in FIG. 2, at block 201, the object builder computing system identifies a first set of data (e.g., indicative of one or more first attributes or one or more first objects). For example, the object builder computing system may identify the first set of data based on analytics data associated with an attribute (e.g., indicating an exposure, a popularity, a trending status, etc. of the attribute).

In some cases, to obtain the first set of data, the object builder computing system may monitor one or more remote computing systems to obtain monitored data. In some cases, the object builder computing system may generate the monitored data.

Based on the monitored data, the object builder computing system may identify one or more first attributes (e.g., ingredients, sequences of ingredients, customizations, profiles, etc.) and/or one or more first objects. The object builder computing system may identify the first set of data based on determining that all or a portion of the monitored data satisfies one or more exposure thresholds (e.g., indicating that the one or more first attributes are trending, popular, etc.).

In some cases, the object builder computing system may store location data indicating a location of the remote computing systems associated with the monitored data and/or the first set of data. Further, the object builder computing system may identify the first set of data based on determining that all or a portion of the monitored data associated with a particular location satisfies one or more exposure thresholds associated with the same location.

In some cases, to obtain the first set of data, the object builder computing system may obtain the first set of data (e.g., directly) from a computing system. For example, the object builder computing system may obtain the first set of data from a remote computing system, a server, a user computing device, etc.

In some cases, to obtain the first set of data, the object builder computing system may monitor a number of searches, requests, etc. for particular objects and/or profiles. For example, the object builder computing system may identify a virtual store and may identify a number of received searches associated with the virtual store that include the term "americano," "smoky," "smoky americano," etc.

At block 202, the object builder computing system identifies a second set of data (e.g., indicative of one or more second attributes and/or one or more second objects). For example, the object builder computing system may obtain a second set of data from account data stored in a local data store by the object builder computing system. The object builder computing system may identify the second set of data (e.g., from the account data store) based on determining that the first set of data satisfies one or more thresholds (e.g., indicating that the one or more first attributes are trending, popular, have been selected or purchased by a threshold number of users, etc.).

In some cases, the second set of data may be user-specific, environment-specific (e.g., store-specific), object-specific, etc. For example, the object builder computing system may identify an object associated with the first set of data and may identify a portion of data stored by the object builder computing system and associated with the object (e.g., the second set of data).

In some cases, the object builder computing system may identify the second set of data based on a compatibility of the first set of data and the second set of data. For example, the object builder computing system may identify one or more first attributes of the first set of data (e.g., smoky, sweet, caffeinated, tart, warm, cold, etc.) and/or one or more second attributes of the second set of data (e.g., smoky, sweet, caffeinated, tart, sour, warm, cold, etc.). The object builder computing system may determine whether the one or more first attributes are compatible with the one or more second attributes. In some cases, the object builder computing system may determine whether the one or more first attributes are compatible with the one or more second attributes based on stored compatibility data (e.g., indicating whether a first flavor profile is compatible with a second flavor profile). For example, the compatibility data may indicate that a grape flavor profile is not compatible with a spicy flavor profile, indicating that a spicy flavor profile is compatible with a sweet flavor profile.

At block 203, the object builder computing system provides the first set of data and/or the second set of data (e.g., the one or more first attributes and/or the one or more second attributes) to obtain an output. For example, the object builder computing system may provide the first set of data and/or the second set of data to a computing system (e.g., a computing system implementing a model). In another example, the object builder computing system may provide the first set of data and/or the second set of data to (e.g., directly to) a model (e.g., a machine learning model). The model may be implemented by the object builder computing system or a separate system (e.g., a remote computing system). In some cases, the object builder computing system may provide location data (associated with the first set of data, the second set of data, and/or one or more users) and/or one or more constraints (e.g., attribute thresholds) to the model.

In some cases, the object builder computing system may perform prompt engineering to generate a prompt for the computing system (e.g., a prompt for the model) based on the first set of data and/or the second set of data. For example, the object builder computing system may perform prompt engineering to generate a prompt based on a particular syntax, code language, format, etc. Further, the prompt may include at least a portion of the first set of data and/or the second set of data. For example, the prompt may include a request to generate a formula for an object based on a base formula for the object based on the second set of data and one or more modifications for the object based on the first set of data. The object builder computing system may provide the generated prompt to the computing system and/or the model.

The object builder computing system may obtain the output from the computing system and/or the model (e.g., in response to providing the first set of data and/or the second set of data). In some cases, the output may be indicative of an object and/or a formula (e.g., a set of attributes) based on the input. In some cases, the object builder computing system can store the output in an object data store for selection by a user and/or cause an object to be generated based on the output.

In some cases, the output may include computer-executable instructions (e.g., to cause generation of the object). In some cases, the output may include a machine readable code. In some cases, the object builder computing system may generate computer-executable instructions and/or machine readable code based on the output.

At block 204, the object builder computing system obtains tag data (e.g., a keyword, a name, a search word, a description, an image, a tag, a token, an element, or a receipt associated with an object) based on the output (e.g., to enable searching for the object). For example, the tag data may be searchable tag data linked to the output. The tag data may be indicative of the object and/or the attributes of the object. In some cases, the object builder computing system may generate (e.g., prepare) the tag data based on the output.

In some cases, the object builder computing system may provide the output to a second model (e.g., a second machine learning model). The second model may be implemented by the object builder computing system or a separate system (e.g., a remote computing system). The second model may provide the tag data based on the output. In some cases, the object builder computing system can store the tag data in the object data store.

In some cases, the object builder computing system may provide the tag data to a computing system. In some cases, the object builder computing system may instruct (e.g., may cause) display of an output based on the tag data.

In some cases, the tag data may be based on the first set of data, the second set of data, and/or the output. The object builder computing system may obtain the first set of data, the second set of data, and/or the output based on monitoring one or more remote computing systems (e.g., the first set of data indicative of one or more posts, communications, etc.), may parse the first set of data, the second set of data, and/or the output, and may generate the tag data based on the first set of data, the second set of data, and/or the output (e.g., based on parsing the first set of data, the second set of data, and/or the output). For example, the object builder computing system may obtain a first set of data indicating a post to a forum that includes the following text "The Purple Drink is Amazing! The combo of blueberry and spicy jalapeno will blow your mind! #PurpleDrink #PurpleForever." The object builder computing system may generate tag data that includes a first tag: "Purple Drink," a second tag: "combo of blueberry and spicy jalapeno," a third tag: "Purple Forever," etc.

In some cases, the object builder computing system may parse the first set of data, the second set of data, and/or the output to identify one or more tokens, elements, words, images, etc. within the first set of data, the second set of data, and/or the output and may generate the tag data based on the identified one or more tokens, elements, words, images, etc.

For example, the object builder computing system may generate the tag data based on performing natural language processing and/or tokenization.

In some cases, the object builder computing system may add the tag data and/or the output to a data store (e.g., the second set of data, a catalog, etc.). For example, the object builder computing system may combine the tag data and the output (e.g., to obtain a formula and tags associated with the formula) and may add the combination of the tag data and the output to the data store. In some cases, the data store may be searchable such that a computing device can identify the formula based on searching for one or more tags of the tag data.

At block 205, the object builder computing system obtains image data (e.g., graphics, visuals, video data, image frames, etc.) based on the output. The image data may be indicative of the object and/or the attributes of the object. In some cases, the object builder computing system may generate (e.g., prepare) the image data based on the output.

In some cases, the object builder computing system may provide the output to a second model (e.g., a second machine learning model). For example, the second model may be a generative model that generates image data associated with the object based on an input (e.g., indicating a formula for the object). The second model may be implemented by the object builder computing system or a separate system (e.g., a remote computing system). The second model may output the image data based on the output of the model. In some cases, the object builder computing system can store the image data in a data store.

In some cases, the object builder computing system may provide the image data to a computing system (e.g., for display). In some cases, the object builder computing system may instruct (e.g., may cause) display of an output based on the image data.

In some cases, the image data may be based on the first set of data, the second set of data, and/or the output. The object builder computing system may obtain the first set of data, the second set of data, and/or the output based on monitoring one or more remote computing systems (e.g., the first set of data indicative of one or more posts, communications, etc.), may parse the first set of data, the second set of data, and/or the output, and/or may generate the image data based on the first set of data, the second set of data, and/or the output (e.g., based on parsing the first set of data, the second set of data, and/or the output). For example, the object builder computing system may obtain a first set of data indicating a post to a forum that includes a video associated with an object. The object builder computing system may obtain a frame of the video and generate image data that includes the frame.

At block 206, the object builder computing system obtains object data based on the output. The object data may link the object to a formula. In some cases, the object builder computing system may generate (e.g., prepare) the object data based on the output. In some cases, the output may link the object to the formula.

In some cases, the object builder computing system may provide the output to a second model (e.g., a second machine learning model). The second model may be implemented by the object builder computing system or a separate system (e.g., a remote computing system). The second model may output the object data based on the output of the model. In some cases, the object builder computing system can store the object data in the object data store.

In some cases, the object builder computing system can provide the object data to a computing system for display.

For example, the object builder computing system can provide the object data for display via a menu (e.g., a digital or virtual menu displayed via a computing device). In some cases, the object builder computing system may instruct (e.g., may cause) display of an output based on the object data.

At block 207, the object builder computing system obtains training data (e.g., a training manual) based on the output. The training data may be text data and/or image data indicating how to build the object. In some cases, the object builder computing system may generate (e.g., prepare) the training data based on the output.

In some cases, the object builder computing system may provide the output to a second model (e.g., a second machine learning model). The second model may be implemented by the object builder computing system or a separate system (e.g., a remote computing system). The second model may output the training data based on the output of the model. In some cases, the object builder computing system can store the training data in a data store.

In some cases, the object builder computing system can provide the training data to a computing system for display. In some cases, the object builder computing system may instruct (e.g., may cause) display of an output based on the training data. In some cases, the object builder computing system may identify one or more workers for training, may provide (e.g., automatically) the training data to one or more user computing devices associated with the one or more workers, and may cause display of the training data via the one or more user computing devices.

At block 208, the object builder computing system obtains educational data (e.g., educational materials) based on the output. The educational data may be text data and/or image data associated with the object (e.g., indicating nutritional facts, cost, attributes, a time period, etc. associated with the object). In some cases, the object builder computing system may generate (e.g., prepare) the educational data based on the output.

In some cases, the object builder computing system may provide the output to a second model (e.g., a second machine learning model). The second model may be implemented by the object builder computing system or a separate system (e.g., a remote computing system). The second model may output the educational data based on the output of the model. In some cases, the object builder computing system can store the educational data in a data store.

In some cases, the object builder computing system can provide the educational data to a computing system for display. In some cases, the object builder computing system may instruct (e.g., may cause) display of an output based on the educational data.

III. GENERATION OF COMPUTER-EXECUTABLE INSTRUCTIONS BASED ON NETWORK COMMUNICATIONS

Figure 3:
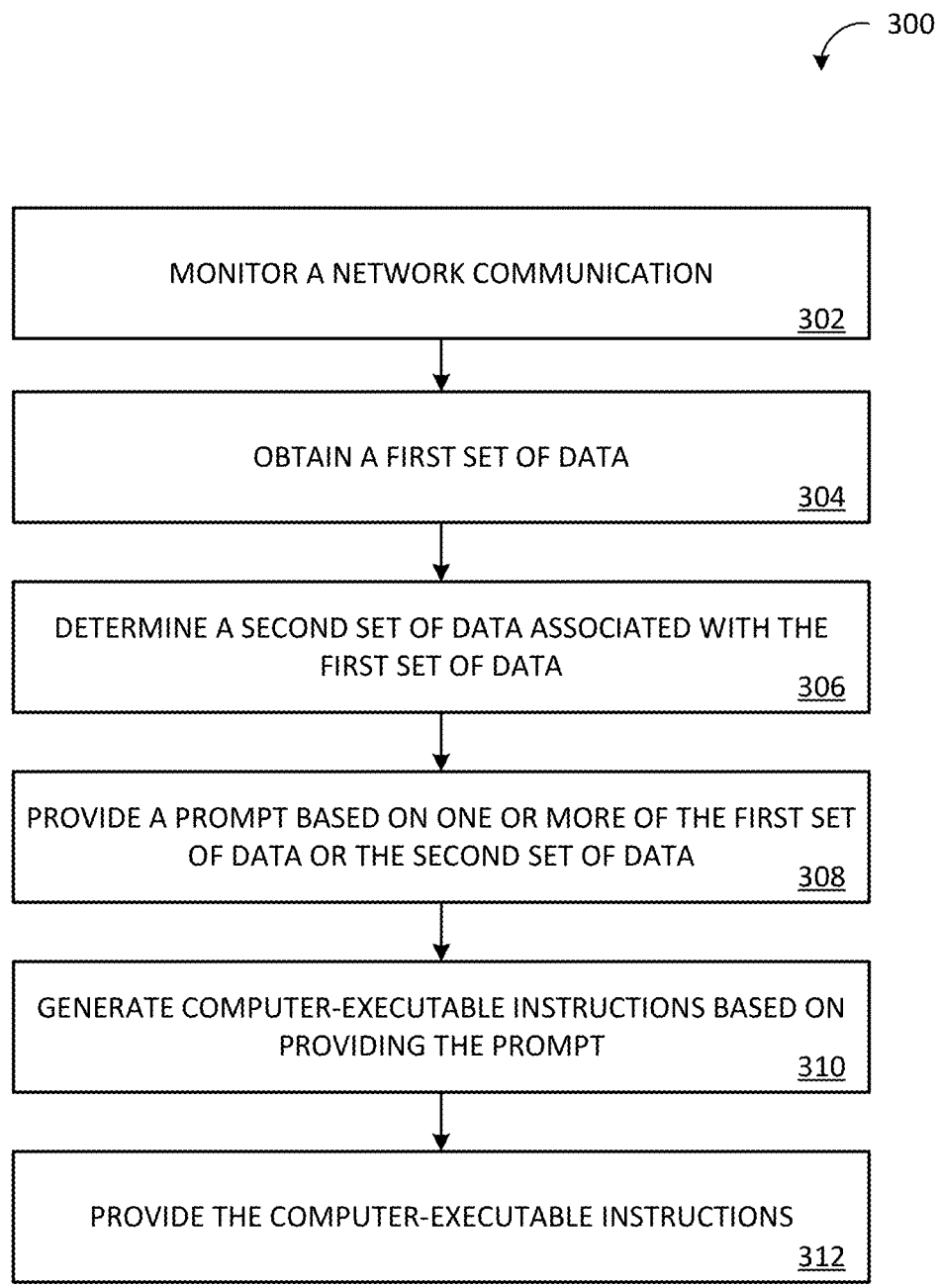
FIG. 3 is a flow diagram depicting examples interactions for generating computer-executable instructions for building an object and providing the computer-executable instructions to a computing system.

FIG. 3 is a flow diagram illustrative of a routine 300 implemented by the object builder computing system (e.g., the object builder computing system 120 as discussed herein with reference to FIG. 1) to generate computer-executable instructions based on network communications. For example, the object builder computing system may include memory hardware storing computer-executable instructions (e.g., first computer-executable instructions) and the object builder computing system may include at least one hardware processor such that execution of the computer-executable instructions by the at least one hardware processor causes the at one hardware processor to execute the routine 300. Although described as being implemented by the object builder computing system (e.g., a hardware processor of the object builder computing system), it will be understood that the elements outlined for routine 300 can be implemented by one or more computing devices or components, such as the computing system 150 as discussed herein with reference to FIG. 1. Thus, the following illustrative embodiment should not be construed as limiting.

At block 302, the object builder computing system monitors a network communication (e.g., one or more network communications). For example, the object builder computing system may monitor one or more network communications of and/or between one or more remote computing systems (e.g., remote from the object builder computing system). To monitor the network communication, the object builder computing system may monitor web traffic, monitor a communication between a first remote computing system and a second remote computing system, monitor a communication from a remote computing system to a server, etc.

The network communication may be associated with an object (e.g., a customized object, an object with a customized flavor profile, etc.). For example, the network communication may reference the object, an attribute of the object, etc.

In some cases, the object builder computing system may obtain monitored data based on monitoring the network communication. For example, the monitored data may include audio data, image data, etc.

At block 304, the object builder computing system obtains a first set of data. For example, the object builder computing system may obtain the first set of data based on monitoring the network communication.

In some cases, to obtain the first set of data, the object builder computing system may perform one or more of audio-to-text conversion, optical character recognition, image data captioning, etc. on the monitored data and may generate the first set of data based on performing the one or more of the audio-to-text conversion, optical character recognition, image data captioning, etc. on the monitored data.

In some cases, to obtain the first set of data, the object builder computing system may obtain the monitored data (e.g., a third set of data) based on monitoring the network communication. The object builder computing system may identify one or more exposure thresholds (e.g., one or more location-specific exposure thresholds) and may filter the monitored data based on the one or more exposure thresholds. For example, the object builder computing system may determine a subset of the monitored data satisfies the one or more exposure thresholds and may generate the first set of data that includes the subset of the monitored data.

The first set of data may indicate and/or may include one or more attributes of the object. For example, the first set of data may indicate components of the object. In some cases, the first set of data and/or the one or more attributes may be associated with (e.g., may be in) in a first data format.

At block 306, the object builder computing system determines a second set of data associated with the first set of data. In some cases, the second set of data may be stored in a data store (e.g., a local data store) and the object builder computing system may obtain the second set of data from the data store. In some cases, the first set of data and the second set of data may have different data formats. For example, the first set of data may be image data and the second set of data may be text data. In another example, the first set of data may be image data and the second set of data may be and/or may include computer-executable instructions. In some cases, the first set of data and the second set of data may be associated with different versions, different formulas, different attributes, etc. of the object. For example, the first set of data may be associated with a first version and/or first formula for the object and the second set of data may be associated with a second version and/or second formula for the object.

The object builder computing system may identify the object based on the first set of data and may determine the second set of data based on the identified object. In some cases, the second set of data may indicate a threshold, ratio, or a quantity associated with the object (e.g., of attributes of the object).

At block 308, the object builder computing system provides a prompt (e.g., a prompt for a machine learning model) based on one or more of the first set of data or the second set of data. In some cases, the object builder computing system may provide the prompt to a computing system (e.g., a first computing system implementing and/or including a machine learning model). In some cases, the object builder computing system may provide the prompt to (e.g., directly to) a machine learning model.

In some cases, the object builder computing system may generate the prompt based on the one or more of the first set of data or the second set of data. For example, the object builder computing system may perform prompt engineering to generate the prompt based on the one or more of the first set of data or the second set of data.

In some cases, the object builder computing system may provide the one or more of the first set of data or the second set of data (e.g., to the computing system and/or the machine learning model).

Based on providing the prompt, the first set of data, and/or the second set of data, the object builder computing system may obtain an output (e.g., from the computing system). For example, the output may be an output of a computing system, an output of a machine learning model.

In some cases, the output may identify and/or indicate one or more adjustments to the one or more attributes of the object (e.g., as indicated by the first set of data and/or the second set of data) based on the threshold, ratio, or quantity. The object builder computing system may identify a modification of the object based on the output to obtain a modified object and may store an identifier of the modified object in a data store. In some cases, the object builder computing system may cause display, via a user interface of a computing device, of the identifier of the modified object.

At block 310, the object builder computing system generates computer-executable instructions (e.g., second computer-executable instructions) based on providing the prompt. For example, the object builder computing system may generate the computer-executable instructions based on the obtained output. In some cases, the computer-executable instructions may be in a second data format. For example, the computer-executable instructions and the first set of data may be in different data formats.

In some cases, the computer-executable instructions may be computer-executable instructions to build the object. In some cases, the object builder computing system may store the computer-executable instructions with an identifier of the object in a data store (e.g., to enable replication of the object).

In some cases, the object builder computing system may modify computer-executable instructions (e.g., third computer-executable instructions) associated with the second set of data based on the output to obtain the computer-executable instructions (e.g., the second computer-executable instructions).

At block 312, the object builder computing system provides the computer-executable instructions. The object builder computing system may provide the computer-executable instructions to a computing system (e.g., a second computing system). For example, the computing system may be a computing system of a machine (e.g., a coffee machine, a dispenser, etc.). In some cases, the object builder computing system may provide the computer-executable instructions directly to the machine.

In some cases, the object builder computing system may store the computer-executable instructions. For example, the object builder computing system may store the computer-executable instructions in the local data store (e.g., with the second set of data).

In some cases, the object builder computing system may obtain location data (e.g., indicating a location) associated with the network communication. The object builder computing system may store the computer-executable instructions with the location data (e.g., may link the computer-executable instructions to the location data). In some cases, the object builder computing system may provide the location data to the computing system (e.g., with the computer-executable instructions). In some cases, the object builder computing system may determine second location data (e.g., indicating a location) associated with a user computing device, a user, a physical environment, etc. and may determine whether the location data corresponds to (e.g., matches) the second location data. Based on determining that the location data corresponds to the second location data, the object builder computing system may provide an identifier of the object for selection (e.g., via the user computing device).

In some cases, the object builder computing system may provide an output indicative of the object and/or the computer-executable instructions. For example, the object builder computing system may cause display of an identifier of the object and/or the computer-executable instructions via a display of a user computing device.

The object may be built based on the computer-executable instructions. For example, the object builder computing system may instruct (e.g., and may cause) the computing system (e.g., the machine) to build the object based on (e.g., using) the computer-executable instructions. In another example, the object builder computing system may instruct multiple computing systems (e.g., machines) to coordinate building of the object (e.g., coordinate a first machine to dispense syrup, a second machine to dispense coffee, a third machine to move the object between the first machine and the second machine, etc.).

In some cases, the object builder computing system may cause output of one or more identifiers of one or more steps for building the object. For example, the object builder computing system may cause a printer to print a list of the one or more identifiers, a display to display the one or more identifiers, etc.

In some cases, the object builder computing system (or a separate system) may obtain a request to build an object (e.g., from a user computing device). For example, the object builder computing system may provide an identifier of the object for selection based on generating the computer-executable instructions and may obtain an input from a user computing device indicating a selection of the identifier and/or a request to build the object. The object builder computing system may instruct building of the object based on the input and/or the request. In some cases, the object builder computing system may determine a location (e.g., a geographical location) associated with the request corresponds to (e.g., matches) a location (e.g., a geographical location) associated with the computer-executable instructions. The object builder computing system may instruct building of the object based on determining that the location associated with the request corresponds to the location associated with the computer-executable instructions.

In some cases, the object builder computing system may provide the output to a machine learning model (or a computing system implementing the machine learning model). The machine learning model may be trained to generate tag data, image data, textual data, etc. based on an input to the machine learning model. Based on providing the output to the machine learning model, the object builder computing system may obtain tag data (e.g., including a keyword, a name, an image, or a receipt associated with the object), image data (e.g., including a graphic), textual data (e.g., including a training manual or educational material associated with the object), etc. In some cases, the object builder computing system may cause display of (e.g., may update a display with) the tag data, image data, textual data, etc.

IV. ARCHITECTURE

Figure 4:
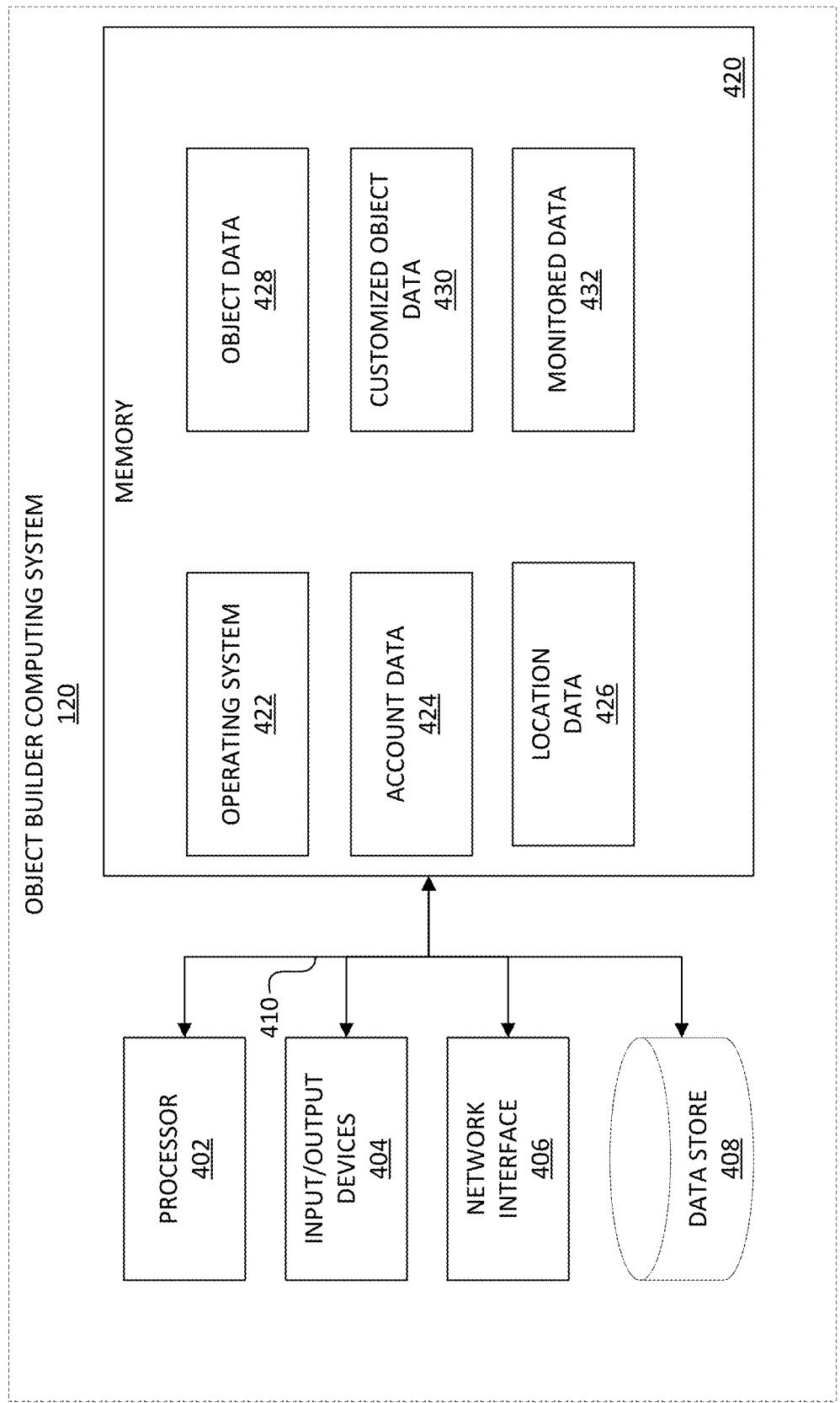
FIG. 4 depicts a general architecture of a computing device providing the object builder computing system that is configured to generate the formula for building an object.

FIG. 4 depicts a general architecture of an object builder computing system 120, which includes an arrangement of computer hardware and software components that may be used to implement aspects of the present disclosure. The object builder computing system 120 may include many more (or fewer) elements than those shown in FIG. 4. It is not necessary, however, that all of these elements be shown in order to provide an enabling disclosure.

As illustrated, the object builder computing system 120 includes a processor 402, input/output devices 404, a network interface 406, and a data store 408, all of which may communicate with one another by way of a communication bus 410. The network interface 406 may provide connectivity to one or more networks (such as the network 110 depicted in FIG. 1) or computing systems and, as a result, may enable the object builder computing system 120 to receive and/or send data and/or instructions from and/or to other computing systems or services, such as the computing device(s) 102 or the third party computing device(s) 104 depicted in FIG. 1. In some embodiments, the object builder computing system 120 may process prompts received from the computing device(s) 102 and/or the third party computing device(s) 104.

The processor 402 may also communicate to and/or from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and/or operation of the object builder computing system 120. The memory 420 may further store specific computer-executable instructions and/or other data (which may be referred to herein as "modules") for implementing aspects of the present disclosure. For example, the memory 420 may include account data 424, location data 426, object data 428, customized object data 430, and/or monitored data 432. In some embodiments, the account data 424, the location data 426, the object data 428, the customized object data 430, and/or the monitored data 432 may be obtained from internal or external data stores (e.g., the account data store 126 of FIG. 1), either directly or via the network 110.

It will be recognized that many of the components described in FIG. 4 are optional and that embodiments of the object builder computing system 120 may or may not combine components. Furthermore, components need not be distinct or discrete. Components may also be reorganized. For example, the object builder computing system 120 may be represented in a single physical device or, alternatively, may be split into multiple physical devices. In some embodiments, components illustrated as part of the object builder computing system 120 may additionally or alternatively be included in other computing devices (such as the computing device(s) 102 of FIG. 1), such that some aspects of the present disclosure may be performed by the object builder computing system 120 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware. For example, some or all of the methods may be or may include a computer-implemented method.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. In addition, the separation of various system components in the implementations described above should not be understood as requiring such separation in all implementations, and it should be understood that the described components and systems can generally be integrated together in a single product or packaged into multiple products.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

In summary, various illustrative embodiments and examples have been disclosed. Although systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A computer-implemented method comprising:
    monitoring one or more network communications of one or more remote computing systems, the one or more network communications associated with an object;
    obtaining a first set of data based on monitoring the one or more network communications, wherein the first set of data indicates one or more first attributes;
    determining a second set of data that is associated with the first set of data, wherein the second set of data is stored in a local data store, wherein the second set of data indicates one or more values of one or more second attributes associated with the object, and wherein the one or more first attributes are different from the one or more second attributes;
    determining a compatibility of the first set of data and the second set of data;
    generating a prompt based on the first set of data and the second set of data based on determining the compatibility of the first set of data and the second set of data;
    providing the prompt to a first computing system;
    obtaining an output from the first computing system based on providing the prompt to the first computing system, wherein the output indicates one or more adjustments to the one or more values of the one or more second attributes based on the one or more first attributes, and wherein the object is modified based on the output to obtain a modified object;
    generating computer-executable instructions based on the output, wherein the computer-executable instructions indicate one or more of tag data, image data, or text data associated with the modified object; and
    providing the computer-executable instructions to a second computing system, wherein the object is built based on the computer-executable instructions.

2. The computer-implemented method of claim 1, further comprising:
    obtaining location data associated with the one or more network communications, wherein the location data is indicative of a location; and
    providing the location data to the second computing system.

3. The computer-implemented method of claim 1, wherein monitoring the one or more network communications comprises one or more of:
 monitoring a communication between a first remote computing system of the one or more remote computing systems and a second remote computing system of the one or more remote computing systems; or
 monitoring a communication from a first remote computing system of the one or more remote computing systems to a server.

4. The computer-implemented method of claim 1, wherein monitoring the one or more network communications comprises:
 monitoring web traffic.

5. The computer-implemented method of claim 1, further comprising:
 instructing building of the object by a machine using the computer-executable instructions.

6. The computer-implemented method of claim 1, further comprising:
 obtaining, from a user computing device, a request to build the object; and
 instructing building of the object by a machine using the computer-executable instructions based on the request.

7. The computer-implemented method of claim 1, further comprising:
 obtaining, from a user computing device, a request to build the object;
 determining that a location associated with the request corresponds to a location associated with the computer-executable instructions; and
 instructing building of the object by a machine using the computer-executable instructions based on determining that the location associated with the request corresponds to the location associated with the computer-executable instructions.

8. The computer-implemented method of claim 1, further comprising:
 based on generating the computer-executable instructions, providing an identifier of the object for selection;
 obtaining, from a user computing device, an input, wherein the input indicates a selection of the identifier of the object; and
 instructing building of the object by a machine using the computer-executable instructions in response to obtaining the input.

9. The computer-implemented method of claim 1, further comprising:
 obtaining first location data associated with the one or more network communications;
 linking the computer-executable instructions to the first location data;
 determining second location data associated with a user computing device;
 determining that the second location data corresponds to the first location data;
 based on determining that the second location data corresponds to the first location data, providing, to the user computing device, an identifier of the object for selection;
 obtaining, from the user computing device, an input, wherein the input indicates a selection of the identifier of the object; and
 instructing building of the object by a machine using the computer-executable instructions in response to obtaining the input.

10. The computer-implemented method of claim 1, further comprising:
 storing the computer-executable instructions in the local data store.

11. The computer-implemented method of claim 1, wherein the computer-executable instructions comprise first computer-executable instructions, wherein the second set of data comprises second computer-executable instructions, wherein generating the computer-executable instructions comprises:
 modifying the second computer-executable instructions to obtain the first computer-executable instructions.

12. The computer-implemented method of claim 1, wherein execution of the computer-executable instructions causes output of one or more identifiers of one or more steps for building the object.

13. The computer-implemented method of claim 1, wherein the first set of data is associated with one or more of a first version of the object or a first formula for the object, and wherein the second set of data is associated with one or more of a second version of the object or a second formula for the object.

14. The computer-implemented method of claim 1, further comprising:
 obtaining audio data based on monitoring the one or more network communications; and
 performing audio-to-text conversion on the audio data, wherein obtaining the first set of data is further based on performing the audio-to-text conversion.

15. The computer-implemented method of claim 1, further comprising:
 obtaining image data based on monitoring the one or more network communications; and
 performing optical character recognition on the image data, wherein obtaining the first set of data is further based on performing the optical character recognition.

16. The computer-implemented method of claim 1, further comprising:
 obtaining image data based on monitoring the one or more network communications; and
 captioning the image data, wherein obtaining the first set of data is further based on captioning the image data.

17. The computer-implemented method of claim 1, further comprising:
 obtaining a third set of data based on monitoring the one or more network communications;
 identifying one or more exposure thresholds; and
 determining a subset of the third set of data is greater than or matches the one or more exposure thresholds, wherein the first set of data corresponds to the subset of the third set of data.

18. The computer-implemented method of claim 1, wherein the first computing system comprises a machine learning model, wherein the prompt comprises a prompt for the machine learning model, wherein providing the prompt to the first computing system comprises:
 providing the prompt to the machine learning model, wherein the output comprises an output of the machine learning model.

19. The computer-implemented method of claim 1, further comprising:
 providing the output to a machine learning model, the machine learning model trained to generate the tag data based on an input to the machine learning model; and obtaining the tag data from the machine learning model, wherein the tag data comprises a keyword, a name, a description, an image, or a receipt associated with the object.

20. The computer-implemented method of claim 1, further comprising:
providing the output to a machine learning model, the machine learning model trained to generate the image data based on an input to the machine learning model; and
obtaining the image data from the machine learning model, wherein a display is updated based on the image data.

21. The computer-implemented method of claim 1, further comprising:
providing the output to a machine learning model, the machine learning model trained to generate the text data based on an input to the machine learning model; and
obtaining the text data from the machine learning model, wherein the text data comprises a training manual or educational material associated with the object.

22. The computer-implemented method of claim 1, wherein the first set of data and the second set of data have different data formats.

23. The computer-implemented method of claim 1, wherein the object comprises a customized object or an object with a customized flavor profile.

24. A computer-implemented method comprising:
obtaining, from a first data source, a first set of data indicating one or more first attributes;
obtaining, from a second data source, a second set of data indicating one or more values of one or more second attributes associated with an object, wherein the one or more first attributes are different from the one or more second attributes;
determining a compatibility of the first set of data and the second set of data;
providing the first set of data and the second set of data to a computing system based on determining the compatibility of the first set of data and the second set of data;
receiving, from the computing system, an output based on providing the first set of data and the second set of data to the computing system, wherein the output identifies one or more adjustments to the one or more values of the one or more second attributes based on the one or more first attributes, and wherein the object is modified based on the output to obtain a modified object;
generating one or more of tag data associated with the modified object, image data associated with the modified object, or text data associated with the modified object;
storing the one or more of the tag data, the image data, or the text data in a data store; and
causing display, via a user interface of a computing device, of the one or more of the tag data, the image data, or the text data, wherein the modified object is built based on the output.

25. A computing device comprising:
memory hardware storing first computer-executable instructions; and
at least one hardware processor, wherein execution of the first computer-executable instructions by the at least one hardware processor causes the at least one hardware processor to:
obtaining a set of data indicating one or more first attributes, wherein the set of data is associated with a first data format;
determining a compatibility of the set of data and an additional set of data;
providing the set of data to a computing system based on determining the compatibility of the set of data and the additional set of data;
obtaining a first output from the computing system based on providing the set of data to the computing system, wherein the first output identifies one or more adjustments to one or more values of one or more second attributes of an object based on the one or more first attributes, wherein the object is modified based on the first output to obtain a modified object, and wherein the one or more first attributes are different from the one or more second attributes;
identifying second computer-executable instructions to build the modified object based on the first output, wherein the second computer-executable instructions are associated with a second data format;
generating one or more of tag data associated with the modified object, image data associated with the modified object, or text data associated with the modified object; and
providing a second output indicative of at least one of the modified object or the second computer-executable instructions, wherein the second output comprises the one or more of the tag data, the image data, or the text data, and wherein the modified object is built based on the second output.

* * * * *